United States Patent Office 3,128,278
Patented Apr. 7, 1964

3,128,278
SUBSTITUTED 1,1-DIPHENYL-4-(1-PIPERIDYL)-BUTANOL-1 DERIVATIVES
Paul N. Craig, Roslyn, and Charles L. Zirkle, Berwyn, Pa., assignors to Smith Kline & French Laboratories, Philadelphia, Pa., a corporation of Pennsylvania
No Drawing. Filed Sept. 8, 1961, Ser. No. 136,730
4 Claims. (Cl. 260—294)

This invention relates to novel substituted piperidino butanols having valuable pharmacological activity. More specifically this invention relates to substituted 1,1-diphenyl-4-(1-piperidyl)-butanol-1 derivatives having antiemetic activity, free from limiting side effects.

The compounds of this invention are particularly useful as antiemetics both by virtue of their chemical structure and pharmacological profile. Being non-phenothiazines, the compounds are devoid of the side effects encountered with the phenothiazine class of antiemetics. The compounds of this invention and in particular the trifluoromethyl substituted derivative, have a low toxicity and further at effective antiemetic dosages they lack the atropine-like side effects such as mydriasis and dryness of the mouth which are sometimes encountered with unsubstituted piperidyl butanols. Although these side effects are not limiting in the unsubstituted series, the surprising lack of these effects in the substituted compounds of this invention results in a very favorable therapeutic ratio. In addition the substituted compounds of this invention have a longer duration of antiemetic activity in comparison to unsubstituted piperidyl butanols.

More specifically the compounds of this invention are represented by the following structural formula:

FORMULA I

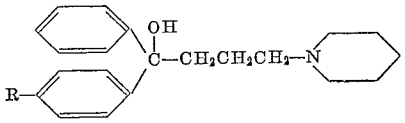

when R represents trifluoromethyl or chlorine, preferably trifluoromethyl.

It is a surprising result of this invention that of the possible R mono substituted ortho, meta and para position isomers, only the para substituted compounds of Formula I have useful antiemetic activity, the ortho and metal substituted compounds being considerably less active.

The nontoxic pharmaceutically acceptable acid addition salts of the compounds of the above formula are also included within the scope of this invention. Such salts are easily prepared by methods known to the art. The base is reacted with either the calculated amount of organic or inorganic acid in aqueous miscible solvent, such as acetone or ethanol, with isolation of the salt by concentration and cooling or an excess of the acid in aqueous immiscible solvent, such as ethyl ether or chloroform, with the desired salt separating directly. Exemplary of such organic salts are those with maleic, fumaric, benzoic, ascorbic, pamoic, succinic, bismethylenesalicylic, methanesulfonic, ethanedisulfonic, acetic, propionic, tartaric, salicylic, citric, gluconic, lactic, malic, mandelic, cinnamic, citraconic, aspartic, stearic, palmitic, itaconic, glycolic, p-aminobenzoic, glutamic, benzene sulfonic and theophylline acetic acids as well as with the 8-halotheophyllines, for example, 8-bromotheophylline. Exemplary of such inorganic salts are those with hydrochloric, hydrobromic, sulfuric, sulfamic, phosphoric and nitric acids. Of course these salts may also be prepared by the classical method of double decomposition of appropriate salts which is well-known to the art.

The compounds of this invention are generally prepared by reacting the appropriately substituted benzophenone with the Grignard reagent of 1-(3-chloropropyl)-piperidine. The reaction is advantageously carried out in tetrahydrofuran solution, although other similar non-reactive organic ether-type solvents may be employed, at reflux temperature for from 1 to 4 hours. Hydrolysis of the intermediate Grignard complex is accomplished with ice water and for example ammonium chloride. Cooling and/or removal of all solvents yields the free base which is distilled or recrystallized and optionally converted to an acid addition salt as described above.

Of course the compounds of this invention may be present as $d$ and $l$ optical isomers as well as the racemic mixture by virtue of the asymmetry at carbon-1. The racemic mixture may be conveniently separated into the optical isomers by standard resolution procedures with for example $d$-tartaric acid. In this specification and claims it is intended by the structural formulas to include both the racemic mixtures and the separated $d$ and $l$ isomers.

The compounds of this invention are combined with a pharmaceutical carrier for internal administration to animals, including human beings, in an amount sufficient to produce antiemetic effects. Such carriers are either solid or liquid. Exemplary of solid pharmaceutical carriers are lactose, corn-starch, mannitol, talc, etc. The compounds of this invention are mixed with the carrier and filled into hard gelatin capsules or tableted with suitable tableting aids such as magnesium stearate, starch or other lubricants, desintegrants or coloring agents. If combination with a liquid carrier is desirable, a soft gelatin capsule is filled with a slurry of the novel compounds in soybean or peanut oil. Aqueuos suspensions or solutions are prepared for alternate oral or parenteral administration.

The dosage unit comprising a compound of this invention and a pharmaceutical carrier contains from about 10 mg. to about 100 mg. of medicament, advantageously from about 20 mg. to about 30 mg. per dosage unit. The medicament in such dosage units is administered orally or parenterally until a satisfactory antiemetic response is obtained. The daily dosage is from about 10 mg. to about 300 mg. of medicament, advantageously from about 20 mg. to about 200 mg. When the method described above is carried out, nausea and vomiting are controlled rapidly and effectively.

The following examples set forth the preparation of the compounds of Formula I.

*Example 1*

A solution of 15.0 g. of 1-(3-chloropropyl)-piperidine (obtained from the alkylation of piperidine with 1-bromo-3-chloropropane) in 50 ml. of tetrahydrofuran is added to 2.4 g. of magnesium in 50 ml. of tetrahydrofuran with some initial heating. When the addition is complete, 15.0 g. of 4-trifluoromethylbenzophenone in 50 ml. of tetrahydrofuran is added and the mixture is refluxed and stirred for 2–3 hours. Hydrolysis of the reaction mixture in the cold and removal of solvents yielded 1-phenyl-1-(4-trifluoromethylphenyl)-4-(1-piperidyl)-butanol-1 as an oil which is distilled, B.P. 154–156° C. at 0.2 mm.

A portion of the free base is converted to the maleate salt in ethyl acetate solution. Melting point of the maleate is 128–129° C.

*Example 2*

A solution of 15.0 g. of 1-(3-chloropropyl)-piperidine in 50 ml. of tetrahydrofuran is added to a mixture of 2.4 g. of magnesium in 50 ml. of tetrahydrofuran. When the addition is complete, 13.0 g. of 4-chlorobenzophenone in 50 ml. of tetrahydrofuran is added and the mixture is refluxed for 2–3 hours. Hydrolysis and workup yields 1-(4-chlorophenyl)-1-phenyl-4-(1-piperidyl)-butanol-1. A portion of the free base is converted to the maleate salt, M.P. 128–129° C.

What is claimed is:
1. A compound selected from the group consisting of a free base having the following formula:

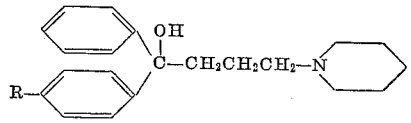

in which R is a member selected from the group consisting of trifluoromethyl and chloro, and the nontoxic pharmaceutically acceptable acid addition salts thereof.

2. A compound of the formula:

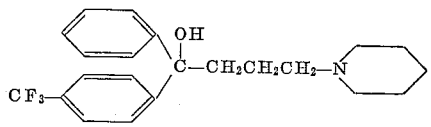

3. A compound of the formula:

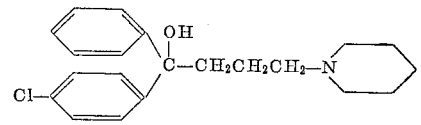

4. 1-phenyl-1-(4-trifluoromethylphenyl) - 4 - (1-piperidyl)-butanol-1 maleate.

References Cited in the file of this patent
UNITED STATES PATENTS
2,649,444    Barrett _____ Aug. 18, 1953
FOREIGN PATENTS
682,160    Great Britain _____ Nov. 5, 1952
682,161    Great Britain _____ Nov. 5, 1952

OTHER REFERENCES
Ose et al.: "Chemical Abstracts," vol. 54, page 17,335 (1960).
Yale: "J. Med. and Pharm. Chem.," vol. 1, No. 2, page 121 (1959).